(12) United States Patent
Glandon et al.

(10) Patent No.: US 8,457,294 B1
(45) Date of Patent: Jun. 4, 2013

(54) TRANSFERRING A COMMUNICATION SESSION

(75) Inventors: David Glandon, Travelers Rest, SC (US); Robert Allen Walston, Sandy Springs, GA (US)

(73) Assignee: ARRIS Group, Inc., Suwanee, GA (US)

( * ) Notice: Subject to any disclaimer, the term of this patent is extended or adjusted under 35 U.S.C. 154(b) by 911 days.

(21) Appl. No.: 12/472,005

(22) Filed: May 26, 2009

Related U.S. Application Data

(60) Provisional application No. 61/055,822, filed on May 23, 2008.

(51) Int. Cl.
*H04M 3/42* (2006.01)
*H04L 12/66* (2006.01)

(52) U.S. Cl.
USPC ............ 379/212.01; 379/207.02; 379/207.03; 370/352

(58) Field of Classification Search
USPC ............. 379/212.01, 201.01, 211.02, 207.02, 379/207.03; 370/352, 493
See application file for complete search history.

(56) References Cited

U.S. PATENT DOCUMENTS

| | | | |
|---|---|---|---|
| 7,450,561 B2 * | 11/2008 | Strater et al. | 370/352 |
| 7,933,295 B2 * | 4/2011 | Thi et al. | 370/493 |
| 2009/0016327 A1 * | 1/2009 | McMahon et al. | 370/352 |

* cited by examiner

*Primary Examiner* — Thjuan K Addy
(74) *Attorney, Agent, or Firm* — Troy A. Van Aacken; Robert J. Starr (57) ABSTRACT

Methods, systems, and apparatus, including computer program products, in which a call transfer can be performed independently of a positive final response in a call transfer to the a third party subject of the call transfer. In some implementations, a first party to the communications session can send a drop/disconnect signal after initiating the call transfer or after receiving an acknowledgement of the initiation of a call transfer.

18 Claims, 6 Drawing Sheets

FIG. 6 ically has a media connection to the second party's communication device, e.g., through a media terminal adaptor (MTA) or embedded media terminal adaptor (EMTA) embedded in a cable modem.

TRANSFERRING A COMMUNICATION SESSION

CROSS-REFERENCE TO RELATED APPLICATIONS

This application claims priority under 35 U.S.C. §119(e) to the benefit and filing date of U.S. Provisional Patent Application Ser. No. 61/055,822, entitled "Method for Transferring a Communication Session," filed on May 23, 2008, which is incorporated herein by reference in its entirety.

TECHNICAL FIELD

This disclosure relates to managing communication sessions.

BACKGROUND

Telephone systems are a ubiquitous part of modern business. Classic telephony systems worked using circuit switched networks that operated to provide routing for a telephone call between parties. Modern telephony has migrated towards packet switched networks beginning with the Signaling System 7 (SS7) networks, which use packet-based communications for signaling. The widespread acceptance of the Internet and other packet-switched networks has hastened the migration of telephony to packet switched protocols, including voice over internet protocol (VoIP) standards.

VoIP developers have tried to duplicate many of the call management services provided by SS7 networks to internet protocol (IP) networks, including, for example, call transfer. In a prior art session initiation protocol (SIP) voice communications session, call transfer involves a first party communication device instructing a second party to establish a communication connection with a third party. The first party's communication device typically has a media connection to the second party's communication device, e.g., through a media terminal adaptor (MTA) or embedded media terminal adaptor (EMTA) embedded in a cable modem.

As the first party attempts to transfer the media connection to the second party, the first party's communication device (e.g., MTA) instructs the second party's device to establish media and signaling connections with the third party's device. In some prior art implementations, the first party's device may also establish a signaling connection with the third party's device. The first party's device terminates participation in the communication session only after receiving an acknowledgement message that the transfer, or transaction, has been completed and a communication session has been established between the second and third parties. Alternatively, if the second party is unable to connect, it may signal a timeout on the connection, at which time the first party can terminate the communications session between the first party and the second party. Processing the message for the completed connection and processing for the timer can use processor resources that could be used for other processes. Similarly the network bandwidth consumed by the now unneeded connection between the first and second parties could be repurposed for other activities. Thus, there is a need in the art to terminate a transferring party's call while minimizing use of processor resources.

SUMMARY

This specification describes mechanisms and techniques by which a call can be transferred. In some implementations, a method can include: sending a call transfer request from a communications interface associated with a first media terminal adapter to a second media terminal adapter, the first and second media terminal adapters being parties to a communications session; receiving an acknowledgement at the communications interface, the acknowledgement notifying the first media terminal adapter that the second media terminal adapter received the call transfer request; initializing a timer in a processor associated with the first media terminal adapter; sending a drop request from the communications interface to the second media terminal adapter upon expiration of the timer, the drop request being sent independently of receiving notification that a communication session between the second media terminal adapter and a third party subject of the call transfer request has been established. Other embodiments of this disclosure include corresponding systems, apparatus, and computer program products.

Other example methods can include: sending a call transfer request from a communications interface associated with a first media terminal adapter to a second media terminal adapter, the first and second media terminal adapters being parties to a communications session; initializing a timer in a processor associated with the first media terminal adapter; sending a drop request from the communications interface to the second media terminal adapter upon expiration of the timer, the drop request being sent independently of receiving notification that a communication session between the second media terminal adapter and a third party subject of the call transfer request has been established. Other embodiments of this disclosure can include corresponding systems, apparatus, and computer program products.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In some implementations of this disclosure, systems and methods operate to reduce the processing and time required to transfer a communications session (e.g., a call). For example, a first party can establish a communications session with a second party or the second party can establish a communication session with the first party. At some point during the communications session, the first party may want to transfer the call to a third party. In such instances, the first party can transmit a transfer request identifying the third party, such that the second party can initiate a communications session with the third party. Instead of waiting for confirmation that a communications session has been established between the second and third parties in response to the transfer request, in some implementations, the first party can drop the communication session after sending the transfer request. In other implementations, the first party can drop the communications session after receiving an acknowledgement from the second party that the second party received the transfer request for the communications session.

Figure 1:
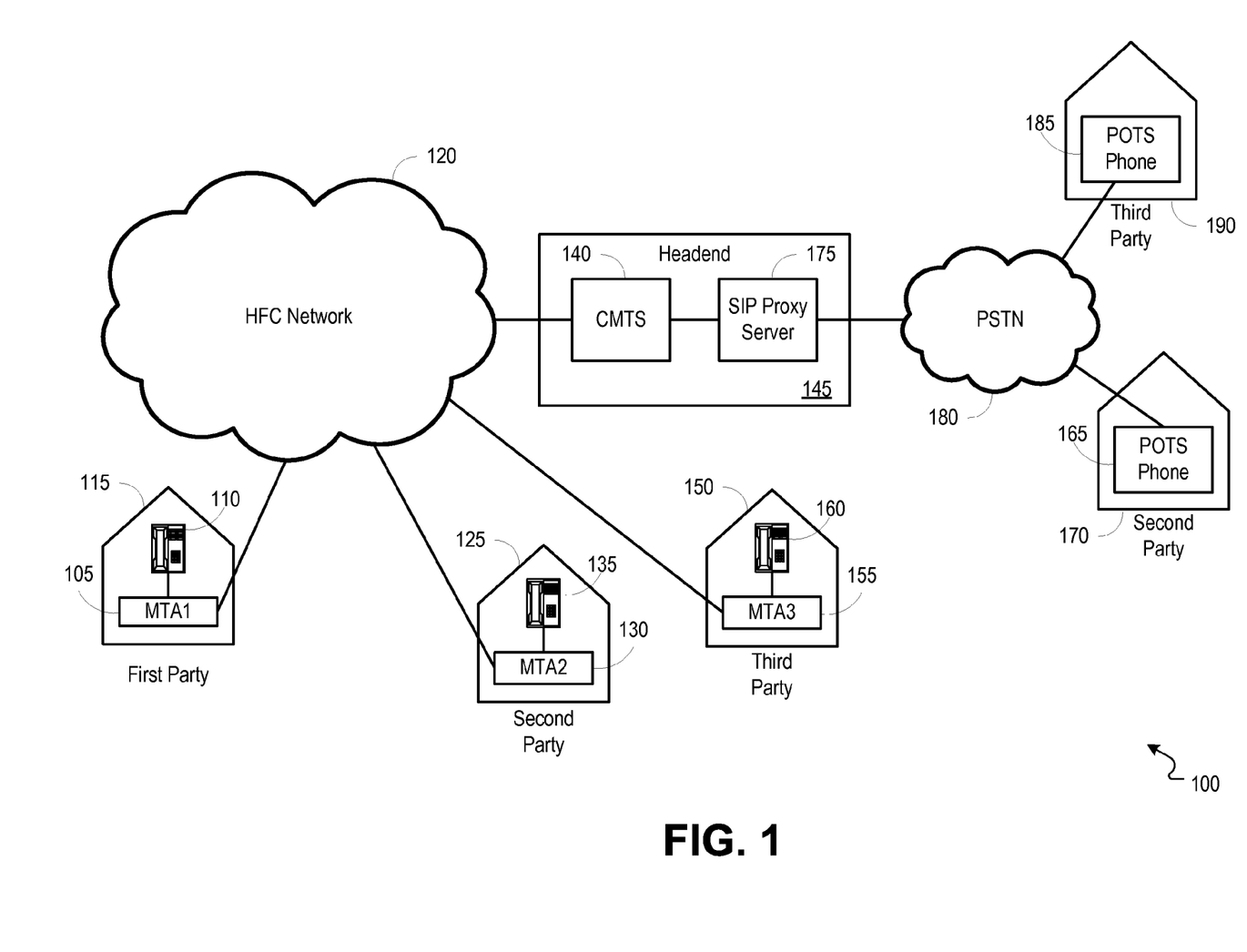
FIG. 1 is a block diagram illustrating an exemplary network environment including an MTA of the present disclosure.

FIG. 1 is a block diagram illustrating an exemplary network environment 100 including an MTA 105 of the present disclosure. The MTA 105 can facilitate a voice communications session from a telephone 110 (e.g., a POTS telephone) associated with a first party 115 through a hybrid fiber coax network 120 to a second party 125 using any of a variety of protocols, including for example, a session initiation protocol (SIP) published by the Internet Engineering Task Force (IETF), or an H.323 standard (and related protocols, including, for example, the H.225 signaling protocol) published by the International Telecommunication Union (ITU), among many other potential packet based streaming audio protocol. The second party 125 can also include an MTA 130 operable to translate the signals received through the HFC network 120 to signals that can be processed by the second party telephone 135, and signals received from the telephone 135 to produce packet based signals (e.g., using IP) that can be transmitted over the HFC network 120.

In some implementations, the packet based signals transmitted through the HFC network 120 can be received and forwarded back to the second party MTA 130 by a SIP proxy server 175 via cable modem termination system (CMTS) 140 residing at a headend 145. The SIP proxy server can coordinate delivery of media to subscribers (e.g., first party 115, second party 125, third party 150, etc.) via the CTMS 140 and MTA (or EMTA) residing at the party's location. In various instances, the media delivered to subscribers can include streaming voice, streaming video and/or other data services. It should be understood that in various instances the SIP proxy server 175 and/or CMTS 140 can forward the voice packets to a second SIP proxy server and/or CMTS residing at second headend, and such packets can be forwarded downstream by the CMTS 140 to an MTA residing on an HFC network associated with the second headend.

In some implementations, when a first party would like to transfer a communication session to a third party, the first party can initiate the transfer using the telephone 110. The MTA 105 can receive an indication of the transfer and generate a session transfer request to the second party. The session transfer request can be sent through the HFC network 120 to the SIP proxy server 175 and can be forwarded to the MTA 130 associated with the second party. In some implementations, the session transfer request can identify a third party to whom the communications session is being transferred.

Upon receipt of the transfer request, the MTA 130 associated with the second party 125 can send a connection request in an attempt to initiate a communications session with the third party 155. The MTA 130 associated with the second party 125 can also send an acknowledgement of receipt of the transfer request to the first party 115.

In some implementations, the MTA 105 associated with the first party 115 can signal to the second party 124 to drop a first communication session between the first and the second party. In one implementation, the MTA 105 associated with the first party 115 can signal the drop request immediately after signaling the transfer request. In another implementation, the MTA 105 can signal the drop request immediately after receiving an acknowledgement of the transfer request from the second party MTA 130.

In other implementations, the MTA 105 can wait a period of time after sending the transfer request before signaling to drop the communications session with the second party 125. Alternatively, the MTA 105 can wait a period of time after receiving an acknowledgement of receipt of the transfer request by the second party 125 before signaling to drop the communications session. In various examples, the period of time can be any of a fixed period of time, a random period of time, a variable period of time, a provisioned period of time (e.g., set by the user of the MTA 105, manufacturer of the MTA 105, or by an administrator of the HFC network).

In such implementations, the drop request initiated by the MTA 105 is independent of a connection being established between the second party 125 and third party 150. Thus, network bandwidth is more efficiently utilized by more quickly eliminating a communication session upon identification of a transfer request. Moreover, the MTA 105 does not have to wait for a confirmation that the communications session between the second party 125 and the third party 150 has been established prior to dropping the communications session, thereby reducing the processor time required for a transfer request.

In other examples, the first party 115 can initiate a communications session with a POTS telephone 165 associated with a second party 170. In such examples, the communications session can be forwarded by the CMTS 140 to a SIP proxy server 175 (e.g., residing at the headend 180). The SIP proxy server 175 can act as a gateway for the communication session packets destined for or received from the PSTN, translating the addressing and signaling to travel on a public switched telephone network (PSTN) 180, which generally uses telephone numbers for addressing and uses Signaling System 7 (SS7) protocols to provide signaling between devices on the PSTN 180. The SIP proxy server 175 also acts as a proxy server for the MTA 105 to receive packets from the PSTN 180, since the MTA is typically not addressed on the PSTN 180.

When a first party 115 would like to transfer a communications session to a third party 185, the MTA can signal a transfer request to the SIP proxy server 175. The SIP proxy server 175 can relay the transfer signal onto the PSTN 180. In some implementations, after signaling the transfer request to the SIP proxy server 175, the MTA 105 can initiate a drop request to end the communications session between the first party 115 and the second party 170. If the PSTN 180 requires that the first party remains a party to the call until the transfer is complete, the SIP proxy server 175 can hold the connection open until the transfer has occurred.

Alternatively, if the PSTN 180 does not require that the first party remains a party to the call until the transfer is complete, the SIP proxy server 175 can signal the PSTN 180 to drop the connection to the POTS telephone 165 associated with the second party 170. In such implementations, SS7 network devices including a signal transfer point, signal switching point and signal control point can control the transfer of the communications session to include the POTS telephone 185 associated with the third party 190 after the SIP proxy server 175 has signaled a drop request to the PSTN 180.

As disclosed above, the MTA 105 associated with the first party 115 or the SIP proxy server 175 can signal a drop request immediately after transmitting the transfer request, some period of time after transmitting the transfer request, immediately after receiving an acknowledgement that the second party 170 received the transfer request, or some period of time after receiving the acknowledgement that the second party 170 received the transfer request. Thus, the disconnection of the communications session between the first party 115 and the second party 170 is independent of confirmation that the transfer of the communications session was successful, thereby reducing processing time and freeing network bandwidth. It should also be understood that, in accordance with this disclosure, the second and third parties do not need to be on the same network. For example, the second party can be on the PSTN network and the third party can be on the HFC network, or the second party can be on the HFC network and the third party can be on the PSTN network.

In some implementations, the concepts described herein can be applied to PSTN/SS7 networks or NCS based telephony processing to provide early termination of call transfer.

Figure 2A:
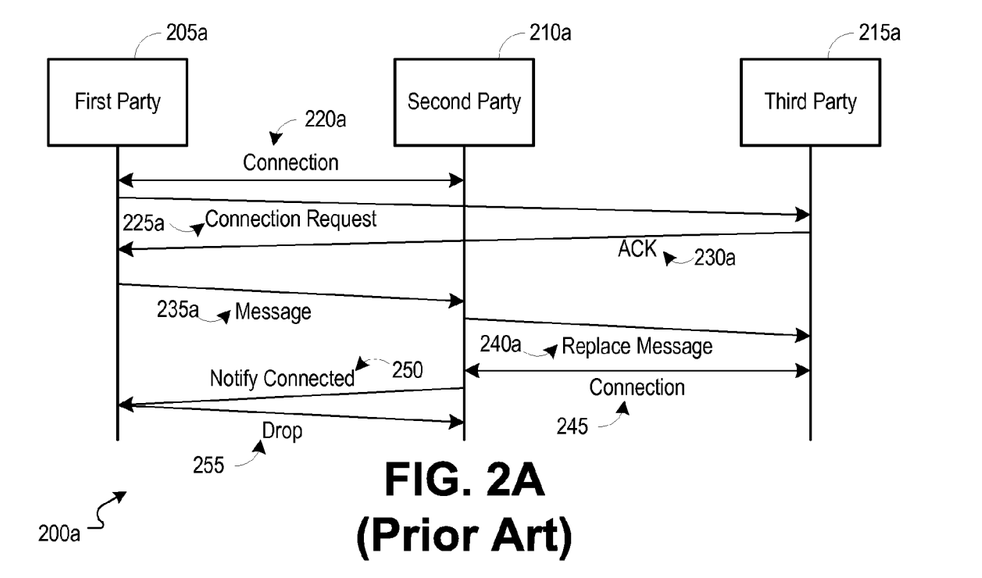
FIGS. 2A and 2B are sequence diagrams illustrating an example call flow for transferring a communication session.
Figure 2B:
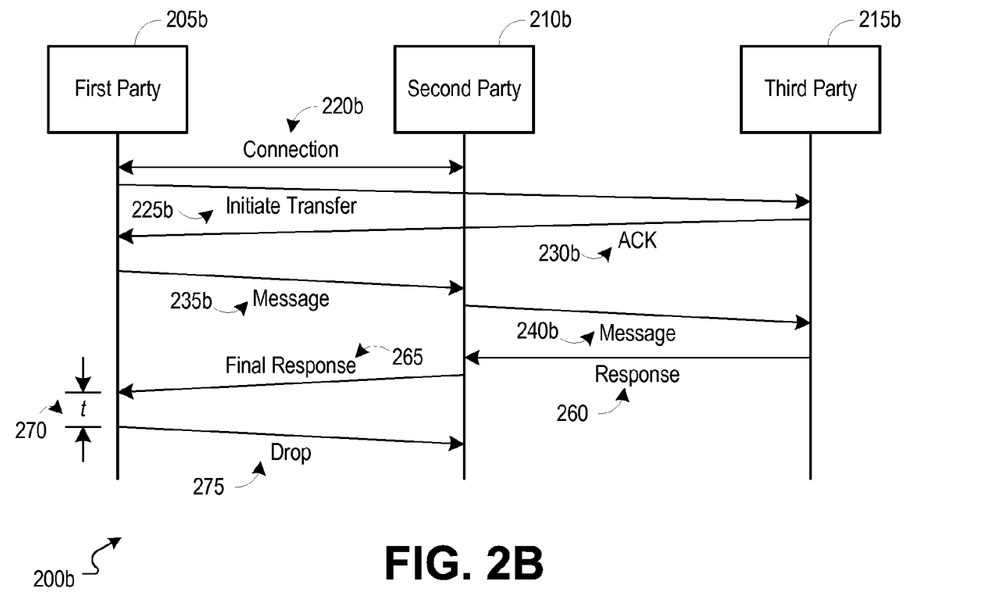

FIGS. 2A and 2B are sequence diagrams illustrating call flow for transferring a communication session. In particular FIG. 2A illustrates a prior art call flow for transferring a SIP-based communications session. The call flow illustrated 2A includes a first party 205a, a second party 210a, and a third party 215a. The call flow can begin at connection 220a, identifying a previously established connection between the first party 205a and the second party 210a. At 225a, the first party 205a initiates a transfer request by sending a connection request to the third party 215a. The initiation of the transfer can include an identification of a third party 215a to whom the communications session is being transferred. In some examples, the first party 205a can initiate a call transfer by flashing a telephone used to make the call to the second party 210a, dialing a third party 215a and then putting the telephone on hook.

Upon receiving the transfer request from the first party 205a, the third party 215a can send an acknowledgement 230a of the connection request to the first party 205a. The first party 205 can send a message to the second party 210a. In some examples, the message from the first party 205a to the second party 210a can be a "refer" message, identifying the third party to the second party. The refer message can also include a replacement key. The replace key can be used to authenticate a "replace" message 240a sent from the second party 210a to the third party 215, telling the third party to replace the address of the first party 205a with the address of the second party 210a.

A connection 245 is established between the second party 210a and third party 215a after the third party 215a has replaced the first party 205a address with the second party 210a address for communications that are part of the established session. The second party 210a can then provide a positive response 250 to the first party 205a, notifying the first party 205a that a connection has been established. Immediately upon receiving a positive acknowledgement, the first party can drop/disconnect 255 from the second party 210a.

FIG. 2B illustrates a new call flow 200b for transferring a SIP-based communications session. The call flow illustrated FIG. 2B includes a first party 205b, a second party 210b, and a third party 215b. The call flow 200b can begin at connection 220b, identifying a previously established connection between the first party 205b and the second party 210b. At 225b, the first party 205b initiates a transfer request by sending a connection request to the third party 215b. The initiation of the transfer can include an identification of a third party 215b to whom the communications session is being transferred. In some examples, the first party 205b can initiate a call transfer by flashing a telephone used to make the call to the second party 210b, dialing a third party 215b and then putting the telephone on hook.

Upon receiving the transfer request from the first party 205b, the third party 215b can send an acknowledgement 230b of the connection request to the first party 205b. The first party 205b can send a message to the second party 210b. In some examples, the message from the first party 205b to the second party 210b can be a "refer" message, identifying the third party to the second party. The refer message can also include a replacement key. The replace key can be used to authenticate a "replace" message 240b sent from the second party 210b to the third party 215b, telling the third party to replace the address of the first party 205b with the address of the second party 210b.

A response 260 is sent from the third party 215b to the second party 210b. The response can indicate whether a connection to the third party 215b has been established or failed. The second party 210b can then provide a final response 265 to the first party 205b, notifying the first party 205b whether a connection has been established or failed. Some period of time, t, after the final response is received 270, the first party drops/disconnects 275 from the second party 210b. However, the drop/disconnect decision 275 is not dependent upon a positive connection response being received from the second party 210b.

Figure 3:
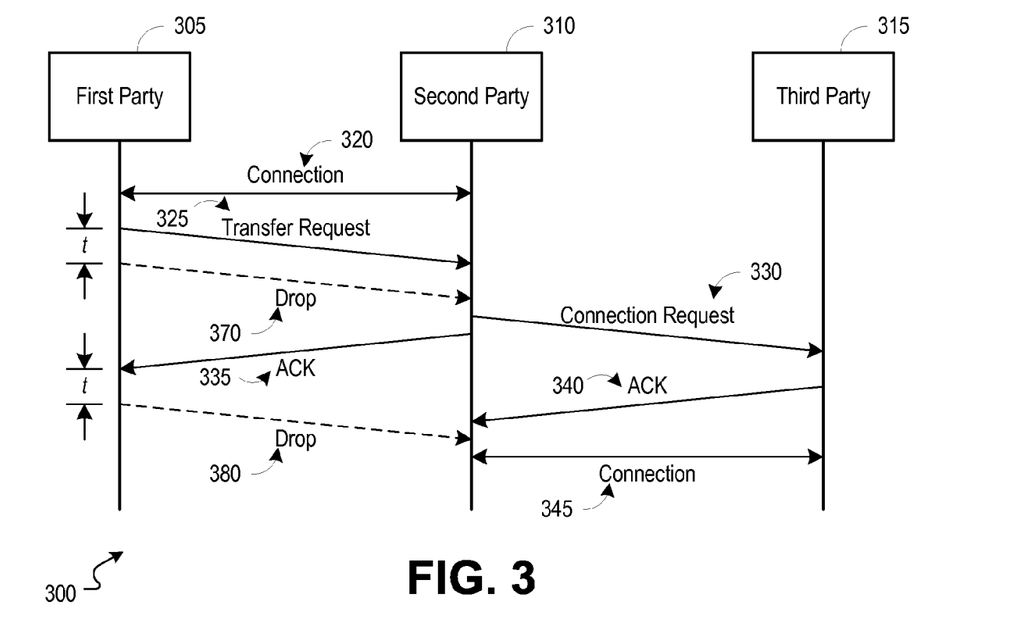
FIG. 3 is a sequence diagram illustrating an example call flow for blind transfer of a communication session.

FIG. 3 illustrates a new call flow 300 for blind transfer of a SIP-based communications session. The call flow illustrated 3 includes a first party 305, a second party 310, and a third party 315. The call flow can begin at connection 320, identifying a previously established connection between the first party 305 and the second party 310. At 325, the first party 305 initiates a transfer request to the second party 310. The transfer request 325 can include an identification of a third party 315 to whom the communications session is being transferred.

Upon receipt of the transfer request, the second party 310 can initiate a connection request 330 to the third party 315 identified by the transfer request 325. The second party 310 can also send an acknowledgement 335 of the transfer request 325 to the first party 305. In alternative implementations, the acknowledgement can precede or occur substantially simultaneously to the connection request 330. The second and third parties 310, 315, respectively, can negotiate the connection 345 as shown.

The first party 305 can initiate a drop request to the second party 310 to discontinue the communications session between the first and second parties 305, 310. The drop request can be initiated independently of the receipt of any confirmation that a connection has been established between the second and third parties 310, 315, respectively.

In some implementations, after sending the transfer request, the first party 305 can initiate a drop request 370 a period of time (t) after the transfer is initiated. In various implementations, t can be a fixed period of time, a random period of time, or a variable period of time. In other implementations, t can be provisionable by a user of the first party MTA 305, set by a manufacturer of the first party MTA 305, or set by an administrator of an HFC network to which the first party MTA 305 belongs, among others. It should be understood that in some implementations, t is zero, and the drop request 370 occurs substantially simultaneously to the transfer request 325.

In other implementations, after receiving an acknowledgement 335 of the transfer request 325, the first party 305 can initiate a drop request 380 after a period of time (t). As in the above disclosure, in various implementations, t can be a fixed period of time, a random period of time, or a variable period of time. In other implementations, t can be provisionable by a user of the first party MTA 305, set by a manufacturer of the first party MTA 305, or set by an administrator of an HFC network to which the first party MTA 305 belongs, among others.

Figure 4:
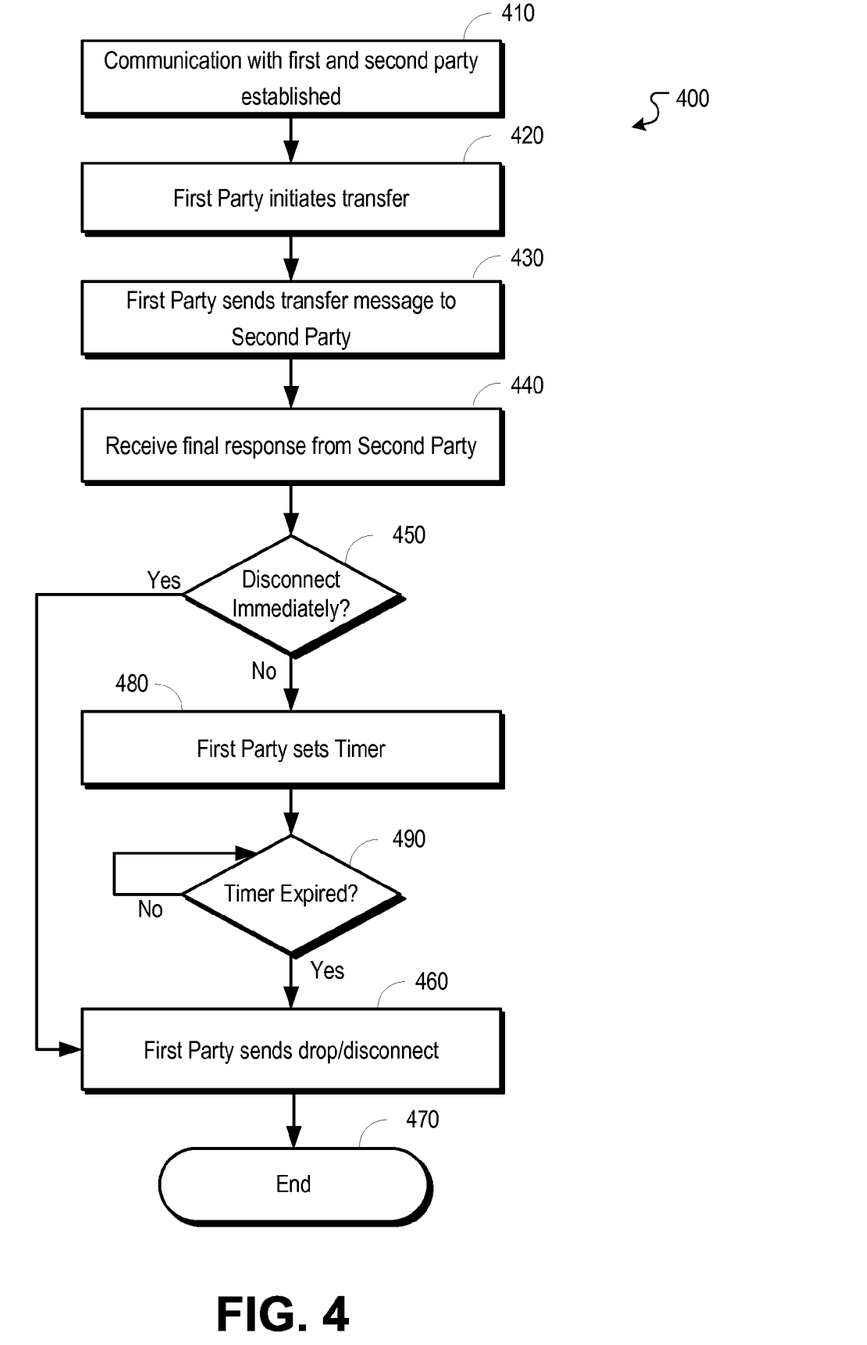
FIG. 4 is a flowchart illustrating an example process for transferring a communication session.

FIG. 4 is a flowchart illustrating an example process for transferring a communications session. At stage 410, communication with a first and second party is established. The communication between the first and second party can be established, for example, by a first party MTA (e.g., MTA 105 of FIG. 1) or EMTA communicating with a second party MTA (e.g., MTA 130 of FIG. 1) or EMTA through an HFC network (e.g., HFC network 120 of FIG. 1). The connection can be managed, for example, by one or more SIP proxy servers (e.g., SIP proxy server 175 of FIG. 1) at a headend location (e.g., headend 145 of FIG. 1).

At stage 420, the first party initiates a transfer. In some implementations, the transfer initiation can be sent by the first party MTA to the third party MTA via a SIP proxy server. The transfer can be initiated, for example, by flashing the telephone at the first party, dialing a third party telephone number (e.g., address), and putting the handset on hook.

At stage 430, the first party sends a transfer message to the second party. In some implementations, the transfer message is a "refer" message. A "refer" message can identify both a third party with whom the second party should begin communicating, as well as a "replacement" key for the second party to send to the third party. The replacement key can be sent from the second party to the third party, to notify the third party that the third party should replace the address of the first party in communication session packets with the address of the second party. The key can provide authentication such that malicious devices are inhibited from sending replacement messages to devices without authorization from the device that the entity originating the replacement message purports to be replacing.

At stage 440, a final response is received from the second party. Depending upon whether the third party connection is successful, the final response can be either a positive or a negative response indicating that a connection has been established or has failed, respectively.

At stage 450, a decision is made whether to disconnect immediately. If the decision is made to disconnect immediately, at stage 460, the first party sends a drop/disconnect to the second party. In this implementation, the drop/disconnect decision is made independent of whether the final response was positive (e.g., that a connection was established between the second and third parties). Thus, in some implementations, the drop/disconnect can be made immediately without regard to the value in the final response. At stage 470, the process 400 is complete.

At stage 480, if the decision is made not to disconnect immediately, the first party sets a timer. In some implementations, the timer can be set by a processor associated with a first party MTA. In various implementations, the timer can be set to expire at a fixed time, a random time or a variable time. In other implementations, the timer can be provisionable, or set, by a user of the first party MTA, a manufacturer of the first party MTA, or an administrator of an HFC network associated with the first party MTA.

At stage 490, a check is made to determine whether the timer has expired. If the timer has not expired, the process repeats the check on whether the timer has expired. This check continues to be performed until the timer expires. When the timer expires, the process 400 proceeds to stage 460, where the first party sends a drop/disconnect to the second party. Thus, in some implementations, the drop/disconnect can be made immediately without regard to the value in the final response. At stage 470, the process 400 is complete.

Figure 5:
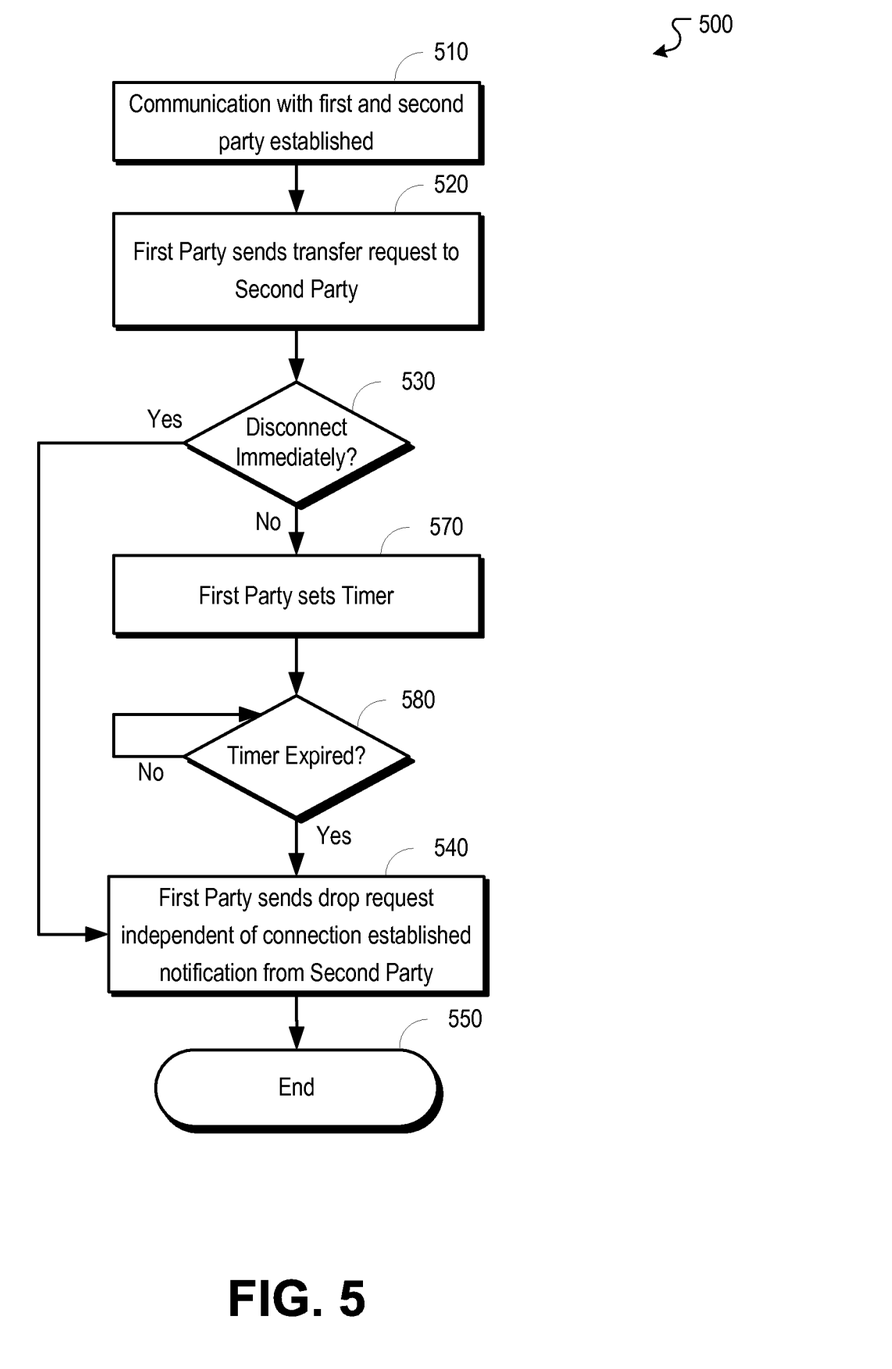
FIG. 5 is a flowchart illustrating another example process for transferring a communication session.

FIG. 5 is a flowchart illustrating an example process 500 for performing a blind transfer of a communication session. At stage 510, communication with a first and second party is established. The communication between the first and second party can be established, for example, by a first party MTA (e.g., MTA 105 of FIG. 1) or EMTA communicating with a second party MTA (e.g., MTA 130 of FIG. 1) or EMTA through an HFC network (e.g., HFC network 120 of FIG. 1). The connection can be managed, for example, by one or more SIP proxy servers (e.g., SIP proxy server 175 of FIG. 1) at a headend location (e.g., headend 145 of FIG. 1).

At stage 520, the first party sends a transfer request to the second party. In some implementations, the transfer request can be sent by the first party MTA to the second party MTA via a SIP proxy server. The transfer request can include, for example, data identifying a third party with whom the second party should initiate a communications session.

At stage 530, a determination is made whether to disconnect immediately. The determination about whether to disconnect immediate can be based upon, for example, a configuration associated with the first party MTA.

If the determination is made to disconnect immediately, the first party sends a drop request to the second party independent of notification that a connection has been established between the second and third parties, as shown at stage 540. In such implementations, the first party MTA can request to drop the communications session with the second party MTA substantially simultaneously to sending the transfer request to the second party MTA. At stage 550, the process 500 is terminated.

In parallel to the determination of whether the communications session should be disconnected immediately, 500 the second party can attempt to establish a connection the third party independent of whether the first party has initiated a drop request with respect to the communications session between the first party and second party. After the connection between the first and second parties has been established (or has failed to be established), the process 500 ends at stage 550.

Returning to stage 530, if it is determined that the communications session will not be immediately disconnected, then the first party sets a timer at stage 570. In some implementations, the timer can be set by a processor associated with a first party MTA. In various implementations, the timer can be set to expire at a fixed time, a random time or a variable time. In other implementations, the timer can be provisionable, or set, by a user of the first party MTA, a manufacturer of the first party MTA, or an administrator of an HFC network associated with the first party MTA.

At stage 580, a determination is made as to whether the timer has expired. The determination of whether the timer has expired can be made, for example, by a processor associated with the first party MTA. The process can continue to test whether the timer has expired until the timer has expired (or, e.g., until an interrupt is encountered). When the timer has expired, the process 500 proceeds to stage 540.

At stage 540, the first party sends a drop request to the second party independent of notification that a connection has been established between the second and third parties. Thus, in such implementations, the first party sends a drop request after a period of time has expired. The drop request can be sent, for example, by a communications interface as instructed by a processor of the first party MTA. The process ends at stage 550.

Figure 6:
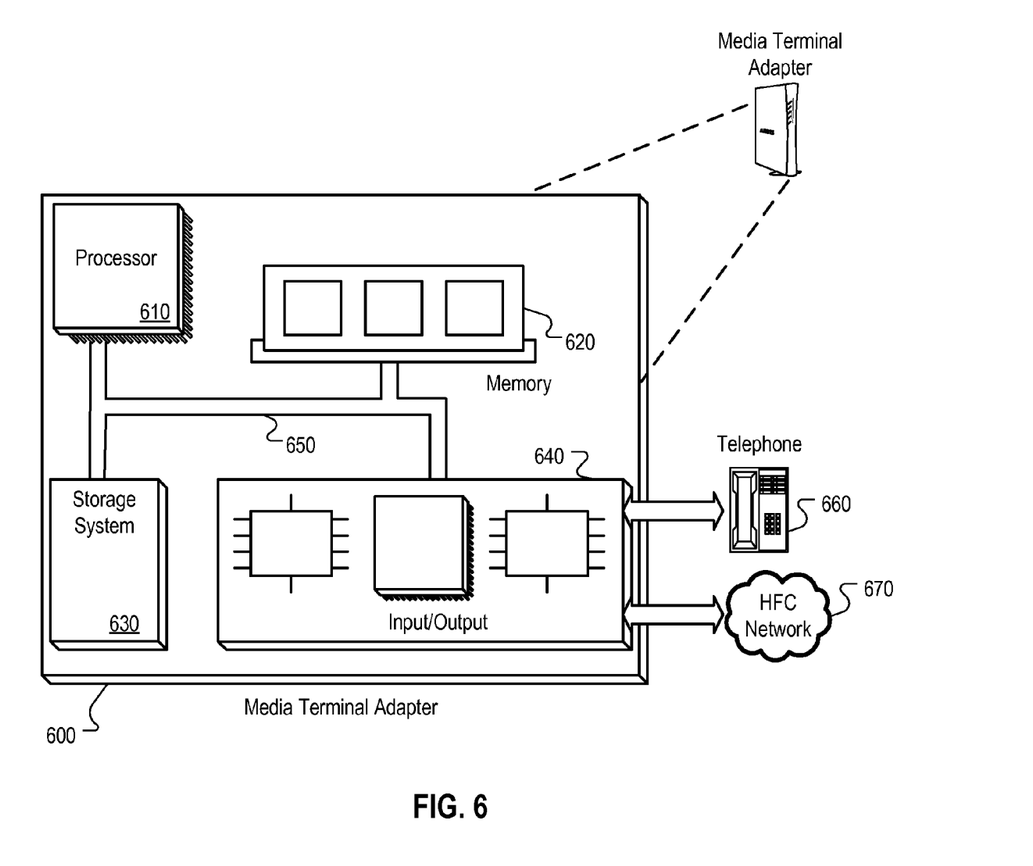
FIG. 6 is a block diagram of an example media terminal adapter that can execute instructions to perform a communication session transfer process.

FIG. 6 is a block diagram of an example media terminal adapter 600 that can execute instructions to perform a communication session transfer process. The MTA 600 (or EMTA) can includes a processor 610, a memory 620, a storage device 630, and an input/output device 640. Each of the components 610, 620, 630, and 640 can, for example, be interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

In some implementations, the storage device 630 is capable of providing mass storage for the system 600. In one implementation, the storage device 630 is a computer-readable medium. In various different implementations, the storage device 630 can, for example, include a hard disk device, an optical disk device, flash memory or some other large capacity storage device.

The input/output device 640 provides input/output operations for the system 600. In one implementation, the input/output device 640 can include one or more of a plain old telephone interface (e.g., an RJ11 connector), a network interface device, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., telephone 660 and HFC network 670. Other implementations, however, can also be used, such as mobile computing devices, mobile communication devices, set-top box television client devices, etc.

The MTA or EMTA of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A computer-implemented method, comprising:
   a) initiating a call transfer from a first media terminal adapter to a third media terminal adapter, the transfer being initiated by sending a connection request to the third media terminal adapter;
   b) receiving a final response at the first media terminal adapter from a second media terminal adapter, the final response notifying the first media terminal adapter that a signaling response was received at the second media terminal adapter;
   c) initializing a timer in a processor associated with the first media terminal adapter;
   d) sending a drop signal from the first media terminal adapter to the second media terminal adapter upon expiration of the timer.

2. The computer-implemented method of claim 1, wherein the timer expires immediately such that the drop request is sent immediately after receiving the final response, and wherein the drop request is sent independently of a positive final response.

3. The computer-implemented method of claim 1, wherein the timer expires after a fixed period of time.

4. The computer-implemented method of claim 1, wherein the timer expires after a variable amount of time.

5. The computer-implemented method of claim 4, wherein the timer expires after a random period of time.

6. The computer-implemented method of claim 1, wherein the timer is provisionable.

7. The computer-implemented method of claim 6, wherein the timer is provisionable by a manufacturer of the first media terminal adapter.

8. The computer-implemented method of claim 6, wherein the timer is provisionable by an administrator of a network associated with the first media terminal adapter.

9. The computer-implemented method of claim 6, wherein the timer is provisionable by a user of the first media terminal adapter.

10. A computer-implemented method, comprising
    a) sending a call transfer request from a communications interface associated with a first media terminal adapter to a second media terminal adapter, the first and second media terminal adapters being parties to a communications session;
    c) initializing a timer in a processor associated with the first media terminal adapter;
    d) sending a drop request from the communications interface to the second media terminal adapter upon expiration of the timer, the drop request being sent independently of receiving notification that a communication session between the second media terminal adapter and a third party subject of the call transfer request has been established.

11. A media terminal adapter, comprising:
    a) at least one media terminal adapter communication interface communicatively coupling the media terminal adapter to one or more networks;
    b) a system data store capable of storing a timer value associated with transfer requests; and
    c) a system processor in communication with the system data store and the at least one media terminal adapter communication interface to manage a first communications session between the media terminal adapter and a second party, wherein the system processor comprises one or more processing elements and wherein the system processor:
        i) initiates a call transfer to send a connection request from the at least media terminal adapter communication interface to a third party;
        ii) receives a final response from a second party;
        iii) initializes a timer in a processor associated with the first media terminal adapter upon receipt of the final response, independent of the value of the final response;
        iv) instructs the communications interface to send a drop request to the second party upon expiration of the timer, independent of the value of the final response.

12. The media terminal adapter of claim 11, wherein the timer expires immediately such that the drop request is sent immediately after receiving the final response.

13. The media terminal adapter of claim 11, wherein the timer expires after a fixed period of time.

14. The media terminal adapter of claim 11, wherein the timer expires after a variable amount of time.

15. The media terminal adapter of claim 14, wherein the timer expires after a random period of time.

16. The media terminal adapter of claim 11, wherein the timer is provisionable.

17. The media terminal adapter of claim 16, wherein the timer is provisionable by one or more of a manufacturer of the media terminal adapter, an administrator of a network associated with the media terminal adapter, or a user of the media terminal adapter.

18. One or more non-transitory computer-readable media having instructions stored thereon, the one or more computer readable media, when executed by a processor, cause the processor to perform operations comprising:
   a) initiating a call transfer from a first media terminal adapter to a third media terminal adapter, the transfer being initiated by sending a connection request to the third media terminal adapter;
   b) receiving a final response at the first media terminal adapter from a second media terminal adapter, the final response notifying the first media terminal adapter that a signaling response was received at the second media terminal adapter;
   c) initializing a timer in a processor associated with the first media terminal adapter;
   d) sending a drop signal from first media terminal adapter to the second media terminal adapter upon expiration of the timer.

* * * * *